J. A. Pelton,
Molding Teeth.
N°. 40,357.   Patented Oct. 20, 1863.

Witnesses:
Algernon K. Johnston
Julius R. Pomeroy

Inventor:
James A. Pelton.

UNITED STATES PATENT OFFICE.

JAMES A. PELTON, OF MIDDLETOWN, CONNECTICUT.

IMPROVEMENT IN MOLDING ARTIFICIAL TEETH.

Specification forming part of Letters Patent No. 40,357, dated October 20, 1863.

*To all whom it may concern:*

Be it known that I, JAMES A. PELTON, of the city of Middletown, in the county of Middlesex and State of Connecticut, have invented an Improvement in Artificial Teeth, forming a new article of manufacture never before known; and I do hereby declare that the following is a full and exact description thereof, reference being had to the accompanying drawings.

My invention consists in the production of six artificial teeth in one continuous curvilinear block by means of a mold, said six teeth being modeled from the six front or center teeth in either the upper or lower jaw, and said curvilinear block corresponding to the bend of the upper or lower jaw so as to make in one solid piece a correct imitation of such six front or center teeth in their natural position with the gum attached.

I am aware that six teeth in a continuous block, curved as aforesaid, have been made by carving and cutting them out of a solid block, but I do not believe that such a continuous set of six or more teeth in a curvilinear block has ever been successfully produced from a mold before this my invention.

The usual practice in molding teeth is to make three only in a block, the curve in the jaw in front being so great that it has been hitherto found impossible by the manufacturers of teeth to make a mold for such six teeth together that can be successfully drawn. I overcome this difficulty by making the upper part of my mold in two separate divisions, so that each can be removed from the lower part of the mold without lifting them in a perpendicular direction.

The mold represented in the accompanying drawings is made for the purpose of producing three distinct sets of six teeth each belonging to the upper jaw. The lower part of the mold on which the concave side of the block of teeth is to be formed is in one solid piece, as shown in Fig. No. 1. The upper part of the mold by which the convex side of the block of teeth is to be formed consists of two divisions, which appear in Fig. No. 2, marked A and B. These divisions may be united to the lower part of the mold by a hinge at *a* and *b*, *c* and *d*, or they may be used without a hinge.

It will be observed from the drawings that each division of the upper part of the mold assists in the formation of the convex side of three teeth, the divisions being joined when the mold is closed over the center of the curve of the jaw, and when the teeth are formed or shaped by pressure and heat in the usual way these divisions opening in the center can be drawn off at an angle of forty-five degrees, or thereabout, or opened on their hinges without destroying or disturbing the body. The upper part of the mold being withdrawn, the teeth can be readily taken from the lower part, their concave side offering no opposition to their removal.

Figure 1:
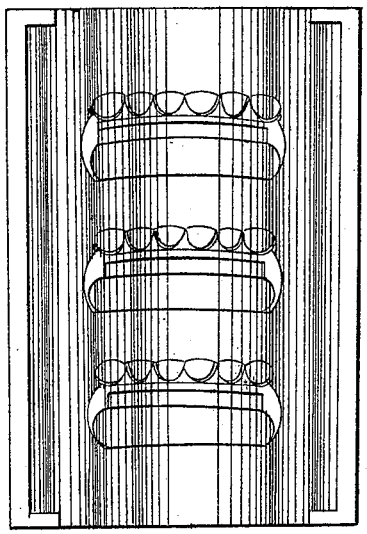
Figure 2:
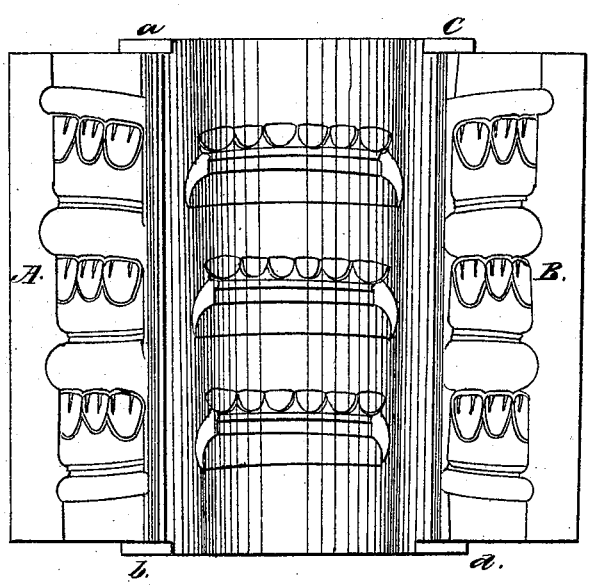
Figure 4:
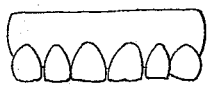
Fig. 4 represents the six front teeth of the upper jaw in one continuous curvilinear block, as formed by means of the mold above described. The six front teeth of the lower jaw are made in the same manner, with the gum attached in one continuous block.
Figure 3:
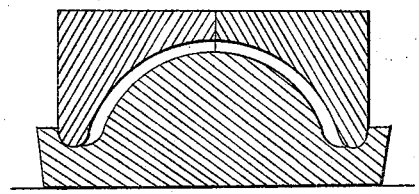
Fig. 3 represents a section of the whole mold when closed, showing the different divisions thereof. The upper part of the mold may be made of more than two divisions, but I have found two divisions sufficient to enable me to draw the mold successfully.

I do not claim the invention or discovery of any new material for the manufacture of artificial teeth, for I use in my mold feldspathic or other material commonly used by tooth-manufacturers; nor do I claim the invention of molding artificial teeth in general terms; but

What I claim as my invention, and desire to secure by Letters Patent, is—

1. The application of a mold substantially as above described to the formation of a set of six front teeth in one continuous curvilinear block.

2. As an article of manufacture, the production of six artificial teeth corresponding to the six front teeth of the human jaw, with the gum attached, in one continuous solid curvilinear block by means of a mold, substantially as above described.

JAMES A. PELTON.

Witnesses:
ALGERNON K. JOHNSTON,
JULIUS R. POMEROY.